(12) United States Patent
Parfrey

(10) Patent No.: US 8,113,287 B2
(45) Date of Patent: Feb. 14, 2012

(54) SELF SEALING HYDRAULIC COUPLER

(75) Inventor: Karl A. Parfrey, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 52 days.

(21) Appl. No.: 12/570,985

(22) Filed: Sep. 30, 2009

(65) Prior Publication Data

US 2011/0073324 A1 Mar. 31, 2011

(51) Int. Cl.
*E21B 34/04* (2006.01)

(52) U.S. Cl. ........ 166/339; 166/344; 166/373; 166/386; 166/332.1

(58) Field of Classification Search ............... 166/339, 166/344, 368, 373, 381, 386, 332.1, 334.1; 137/614.03–614.05; 251/149.1, 149.6, 149.7
See application file for complete search history.

(56) References Cited

U.S. PATENT DOCUMENTS

| | | | | |
|---|---|---|---|---|
| 3,427,051 A * | 2/1969 | White et al. | ............... | 285/145.5 |
| 4,819,692 A * | 4/1989 | Olson et al. | ............... | 137/614.03 |
| 4,832,080 A * | 5/1989 | Smith, III | ............... | 137/614.04 |
| 5,203,374 A * | 4/1993 | Smith, III | ............... | 137/614.04 |
| 5,368,070 A * | 11/1994 | Bosley | ............... | 137/614.04 |
| 5,370,153 A * | 12/1994 | Galle | ............... | 137/614.04 |
| 5,379,798 A * | 1/1995 | Syljeset et al. | ............... | 137/614.04 |
| 5,810,047 A * | 9/1998 | Kirkman | ............... | 137/614.01 |
| 5,810,048 A * | 9/1998 | Zeiner-Gundersen | ... | 137/614.04 |
| 5,865,250 A * | 2/1999 | Gariepy | ............... | 166/375 |
| 6,024,124 A * | 2/2000 | Braun et al. | ............... | 137/614.03 |
| 6,082,402 A * | 7/2000 | Galle et al. | ............... | 137/614.04 |
| 6,123,104 A * | 9/2000 | Smith, III | ............... | 137/614.04 |
| 6,237,632 B1 * | 5/2001 | Smith, III | ............... | 137/614.19 |
| 6,244,348 B1 * | 6/2001 | Gariepy et al. | ............... | 166/375 |
| 6,520,207 B2 * | 2/2003 | Bartlett et al. | ............... | 137/614.19 |
| 6,523,863 B2 * | 2/2003 | Ishiwata | ............... | 285/316 |
| 6,626,207 B1 * | 9/2003 | Smith, III | ............... | 137/614.03 |
| 7,044,441 B2 * | 5/2006 | Doyle | ............... | 251/149.6 |
| 7,100,891 B2 * | 9/2006 | Doyle | ............... | 251/149.6 |
| 7,159,616 B2 * | 1/2007 | Watson et al. | ............... | 137/613 |
| 7,275,563 B2 * | 10/2007 | Tiberghien et al. | ...... | 137/614.04 |
| 7,306,198 B2 * | 12/2007 | Doyle | ............... | 251/149.6 |
| 2010/0024907 A1 * | 2/2010 | Tibbitts | ............... | 137/614.04 |
| 2010/0229981 A1 * | 9/2010 | June | ............... | 137/614.02 |

\* cited by examiner

*Primary Examiner* — Thomas Beach
*Assistant Examiner* — Matthew Buck
(74) *Attorney, Agent, or Firm* — Bracewell & Giuliani LLP

(57) ABSTRACT

A hydraulic coupler for providing fluid communication between adjacent members that includes a two way check valve formed from a double headed poppet set in a hollow cylinder with corrugated bellows like walls. Contoured bores are provided in the cylinder ends and the poppet heads are profiled to match the contour of the bores. When the heads are seated in the bores they form a sealing surface to block fluid from flowing through the coupler. Compressively preloading the cylinder before assembly provides a sealing force between the heads and the bores. Axially compressing the cylinder with respect to the poppet unseats the heads from the bores to form a flow path through the coupler.

10 Claims, 2 Drawing Sheets

SELF SEALING HYDRAULIC COUPLER

FIELD OF THE INVENTION

This invention relates in general to production of oil and gas wells, and in particular to a hydraulic coupler that is bi-directionally self sealing.

DESCRIPTION OF RELATED ART

Actuators for valves and other components in subsea wellheads and for subsea running tools, may be powered by hydraulic fluid delivered from a pressurized hydraulic fluid source. The fluid is typically delivered through a hydraulic circuit running across separate wellhead components. Hydraulic couplers provide a seal where the circuit crosses from one component to another. Many current subsea hydraulic couplings include elastomeric seals. However elastomers can degrade over time and in response to their operating environment and lose their sealing capability. Some existing couplings employ metal-to-metal seals as primary seal elements. Known metal seal hydraulic couplings are complex in design and include many parts. Additionally, at least some of the parts are fragile, such as metal o-rings or metal face seals. These types of seals are easily misaligned; require a precise connection and/or disconnection angle, and subject to damage from debris. The fragile nature of the seals require small manufacturing tolerances that substantially increase cost.

SUMMARY OF INVENTION

Disclosed herein is a hydraulic coupler for use in a subsea wellhead that communicates fluid between a first and a second member. In one embodiment the coupler includes an axially compressible and resilient corrugated tubular, a lower base connected to a lower end of the tubular having a side for pressure communication with a passage formed in the second member, a bore extending through the lower base, an upper base connected to an upper end of the tubular having an upper side in pressure communication with a region ambient to the second member, a bore extending through the upper base, an elongated shaft coaxially disposed within the tubular, on an end of the shaft, an upper head seated against the upper base and defining a pressure seal between the upper base bore and the region ambient to the second member, and on an end of the shaft opposite the upper head, a lower head seated against the lower base and defining a pressure seal between the lower base bore and the passage foamed in the second member. The coupler can also include an annular retainer circumscribing the tubular and adapted to be threadingly secured to the second member, so that the lower base is wedged between the retainer and the second member. A void may be included between the tubular and the retainer adapted to be in pressure communication with the region ambient the second member. The tubular can be an annular bellows member. Also optionally included is a male stab mountable on the first member having a surface that engages with the upper base and circumscribes the upper head, so that contacting the upper base with the male stab compresses the tubular and moves the upper base relative to the upper head, thereby breaching the pressure seal between the outer head and bore in the upper base.

Another embodiment described herein is a hydraulic coupler for use in communicating fluid between members used in hydrocarbon production subsea. The hydraulic coupler can include first and second subsea well members, each having a hydraulic fluid port, a hollow tubular mounted to the first member and having a resilient corrugated side wall and a longitudinal axis, the interior of the tubular or sleeve being in fluid communication with the hydraulic fluid port in the second member, an upper seat in an upper end of the sleeve and facing upward, a lower seat in a lower end of the sleeve and facing downward, a poppet member coaxially disposed in the sleeve having an upper end and a lower end, so that when the sleeve is in a pre-loaded axially compressed configuration, the upper end is in sealing engagement with the upper seat and the lower end is in sealing engagement with the lower seat.

Further disclosed is a method of hydraulically coupling members used in subsea hydrocarbon production. In an embodiment the method includes providing on a member used in subsea hydrocarbon production, a resilient and axially compressible hollow tubular or sleeve having seats at its upper and lower ends, a poppet member coaxially disposed in the sleeve with ends extending outside the ends of the sleeve and in sealing engagement with the seats, so that an end of the sleeve is in pressure communication with a region ambient to the member and the opposite end of the sleeve is in pressure communication with a flow line in the member, compressing the sleeve by applying a force to an end of the sleeve thereby breaching the sealing engagement with the poppet at the end of the sleeve where the force is being applied, pushing the poppet to breach the sealing engagement between the poppet and the other end of the sleeve, flowing fluid between the poppet and an end of the sleeve, through the cylinder, and out the other end of the sleeve, and removing the force compressing the sleeve so that the resilient sleeve returns to its configuration for sealing engagement between the sleeve ends and poppet.

DETAILED DESCRIPTION OF THE INVENTION

Figure 4:
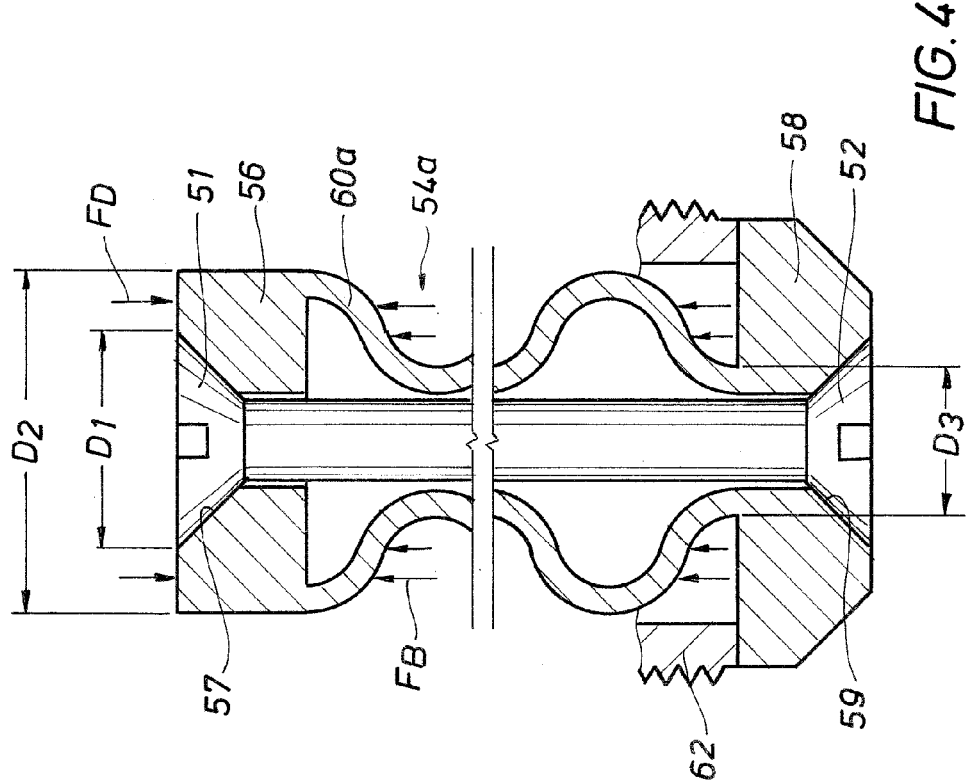
FIG. 4 depicts in a side partial sectional view a force schematic of a simplified embodiment of a hydraulic coupler.

The apparatus and method of the present disclosure will now be described more fully hereinafter with reference to the accompanying drawings in which embodiments are shown. This subject of the present disclosure may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. For the convenience in referring to the accompanying figures, directional twins are used for reference and illustration only. For example, the directional terms such as "upper", "lower", "above", "below", and the like are being used to illustrate a relational location.

It is to be understood that the subject of the present disclosure is not limited to the exact details of construction, operation, exact materials, or embodiments shown and described, as modifications and equivalents will be apparent to one skilled in the art. In the drawings and specification, there have been disclosed illustrative embodiments of the subject disclosure and, although specific terms are employed, they are used in a generic and descriptive sense only and not for the purpose of limitation. Accordingly, the subject disclosure is therefore to be limited only by the scope of the appended claims.

Figure 1:
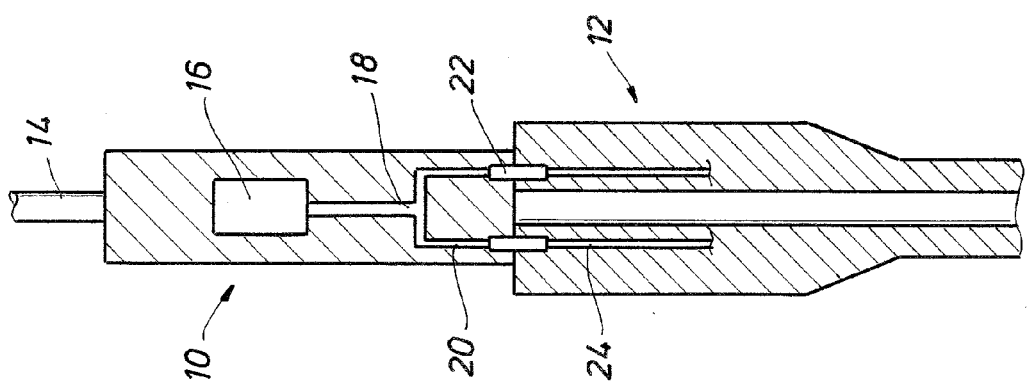
FIG. 1 is a schematical sectional view of a hydraulic coupler between a running tool and a tubing hanger.

Shown schematically in a side partial sectional view in FIG. 1 is an example of a hydraulic coupler for use in coupling hydraulic lines between a running tool 10 and tubing hanger 12. In this example, a running tool 10 is coupled to a tubing hanger 12 for its deployment within a wellhead housing or production tree (not shown). It can also set a seal or packoff between tubing hanger 12 and the tree. The running tool 10 is shown suspended from a typical drill pipe 14 running string and includes passages 20 each connecting to a hydraulic coupler 22, shown disposed between both the running tool 10 and tubing hanger 12. The passages connect on their respective upper ends to umbilicals (not shown) that deliver fluid to the passages 20. As noted above, the hydraulic couplers 22 can provide a sealed way of communicating hydraulic fluid across an interface between two adjacent components. Shown depending from each hydraulic coupler 22 is a fluid passage 24 for distributing the pressurized hydraulic fluid to components (not shown) that may be actuated by selectively directing hydraulic fluid to that component.

Figure 2:
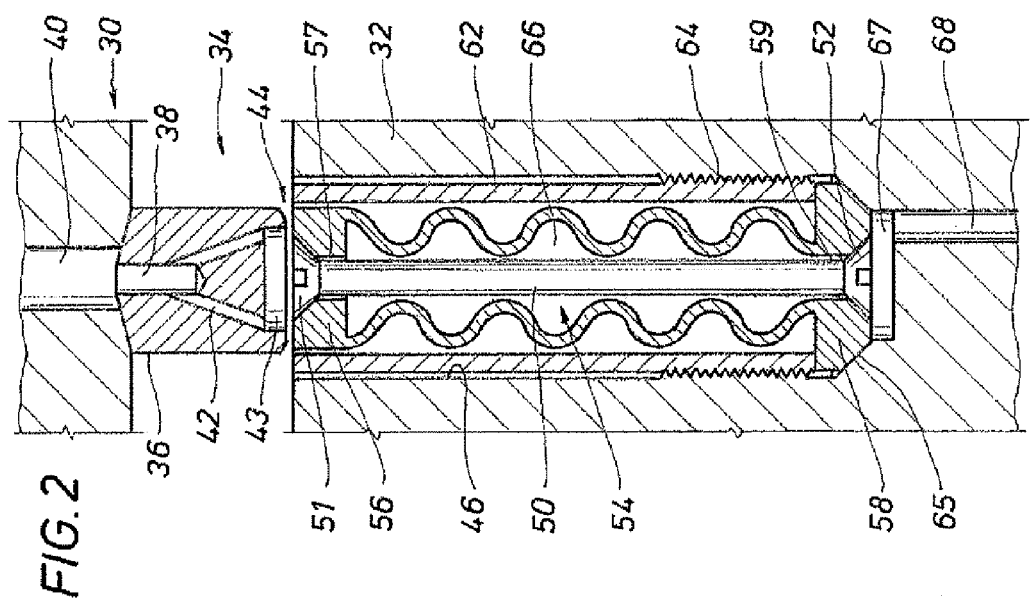
FIG. 2 depicts in a side sectional view an embodiment of a hydraulic coupler in accordance with the present disclosure.

FIG. 2 provides an example of a hydraulic coupler shown in more detail. A side sectional view is shown of a running tool 30 is shown in FIG. 2 mating with a tubing hanger 32 and a detail of a hydraulic coupler 34. As will be described in more detail below, when the tool 30 and hanger 32 are engaged the coupler 34 provides fluid flow therebetween. When the tool 30 and hanger 32 are not engaged, the coupler 34 self seals. In the embodiment of FIG. 2, the hydraulic coupler 34 includes a male stab 36 shown as a cylindrical member depending down from the running tool 30. A bore 38 is shown formed in the stab 36 that extends along the stab 36 axis. The bore 38 is in fluid communication with a fluid lead line 40 within the running tool 30. The bore 38 extends a portion within the male stab 36; distribution lines 42 project obliquely away from the stab 36 axis to a cavity 43 provided on the stab 36 lower face. Through the bore 38 and distribution lines 42, the cavity 43 is in fluid communication with the passage 40.

The hydraulic coupler 34 also includes a cylindrical female portion 44 that is substantially coaxial with the male stab 36 and shown disposed within a pocket 46 in the tubing hanger 32 upper portion. The female portion 44 includes an elongated poppet 48 oriented substantially along the axis of the female portion 44. The poppet 48, shown formed from an elongated shaft 50, includes an upper poppet head 51 on an end shown facing the cavity 43 in the male stab 36. A lower poppet head 52 is on the shaft 50 and facing the bottom end of the pocket 46. Each poppet head 51, 52 has a generally frustoconical cross section and a largely planar surface provided on opposing ends and facing opposing ends of the female portion 44.

Circumscribing the poppet 48 is an annular sleeve 54. A disc-like upper base 56 forms the upper end of the sleeve 54 shown disposed proximate the male stab 36. A bore 57 is provided through the upper base 56 that is contoured in the side of the bore 57 facing the cavity 43. The contour in the bore 57 is formed to match the frusto-conical shape of the upper poppet head 51. Moreover, the interface between the upper poppet head 51 and bore 57 when in contact forms a sealing surface. Optional embodiments exist where the poppet head 51 has a planar lower surface that rests on the outer surface of the base 56.

Similarly, on the end of the sleeve 54 proximate the bottom of the pocket 46 is a lower base 58 with a bore 59 formed therethrough and contoured on the side of the bore 59 facing the bottom of the pocket 46. Similar to the bore 57 on the upper base 56, the bore 59 is contoured to mate with the inclined surface on the lower poppet head 52 and when engaged form a sealing surface. The portion of the sleeve 54 between the upper and lower bases 56, 58 is an annular bellows 60 with an undulating surface and its upper and lower ends connecting respectively to the upper and lower bases 56, 58. Bellows 60 is resilient and in an embodiment formed wholly or partially from steel. As will be described in more detail below, the female portion 44 of the hydraulic coupling 34 is self sealing in both directions across its axis by setting the upper poppet head 51 diameter $D_1$ greater than the bellows 60 diameter $D_3$ where it attaches with the lower base 58 (see FIG. 4).

An annular retainer 62 is shown circumscribing the sleeve 54. The annular retainer 62 is a tube-like member having an inner diameter exceeding the diameter of the upper head 56 and the maximum diameter of the bellows 60. However, the lower base 58 outer diameter exceeds the retainer 62 inner diameter so that the retainer 62 rests on the lower base 58 upper surface when both are set within the pocket 46. Threads 64 are shown formed along corresponding surfaces of the retainer 62 outer surface and pocket 46 inner surface. Engaging these threads 64 secures the retainer 62 within the pocket 46 and wedges the lower base 58 between the retainer 62 and bottom of the pocket 46. Accordingly, the entire female portion 44 is anchored within the pocket 46 by the retainer 62. In the embodiment of FIG. 2, wedging the lower base 58 into the pocket 46 bottom forms a sealing surface 65. Although the threads 64 are illustrated proximate the lower base 58, they can be formed proximate the upper base 56 or between the upper and lower bases 56, 58.

A space 66 is shown formed between the retainer 62 inner diameter and bellows 60 outer surface. The space 66 is in pressure communication with pressure ambient to the tubing hanger 32 and external to the pocket 46. Normally the ambient pressure is hydrostatic water pressure and dependent on the tubing hanger 32 depth. A cavity 67 is provided within the tubing hanger 32 beneath the pocket 46. The cavity 67 is intersected by a flow line 68 shown formed within the tubing hanger 32 in a direction away from the pocket 46 and substantially parallel to the female portion 44 axis.

In one example, assembling the poppet 48 and sleeve 54 involves a bisected poppet; for example, the shaft 50 may include two shaft members connected by a threaded fitting (not shown). In this example, each section of the poppet 48 is inserted through a corresponding recess, the sleeve 54 is compressed, and the two poppet portions screwed together. In this embodiment, the action of compressing the sleeve 54 preloads the sleeve 54 such that the poppet 48 is maintained in tension in the configuration shown in FIG. 2. Other embodiments include threaded fittings at the poppet heads 51, 52 or at any location along the shaft 50.

As noted above, in the configuration of FIG. 2, the hydraulic coupler 34 is self-sealing and prevents fluid flow in either direction across the coupler 34. For example, if flow or pressure were provided within the flow line 68, the sealing surface between the poppet head 52 and lower base 58 prevents flow or fluid within flow line 68 from making its way past the coupler 34. For flow to make its way through the coupler 34, both the sealing surface between the upper poppet head 51 and upper base 56 and the sealing surface between the lower poppet head 52 and lower base 58 must be breached. The sealing surface between the lower poppet head 52 and lower base 58 may be breached if pressure ambient to the tubing hanger 32 is substantially larger than pressure within the cavity 67 so that the bellows 60 compresses and pushes the lower poppet head 52 away from the lower base 58. However for fluid to flow through the coupler 34, the upper sealing surface must also be breached.

Figure 3:
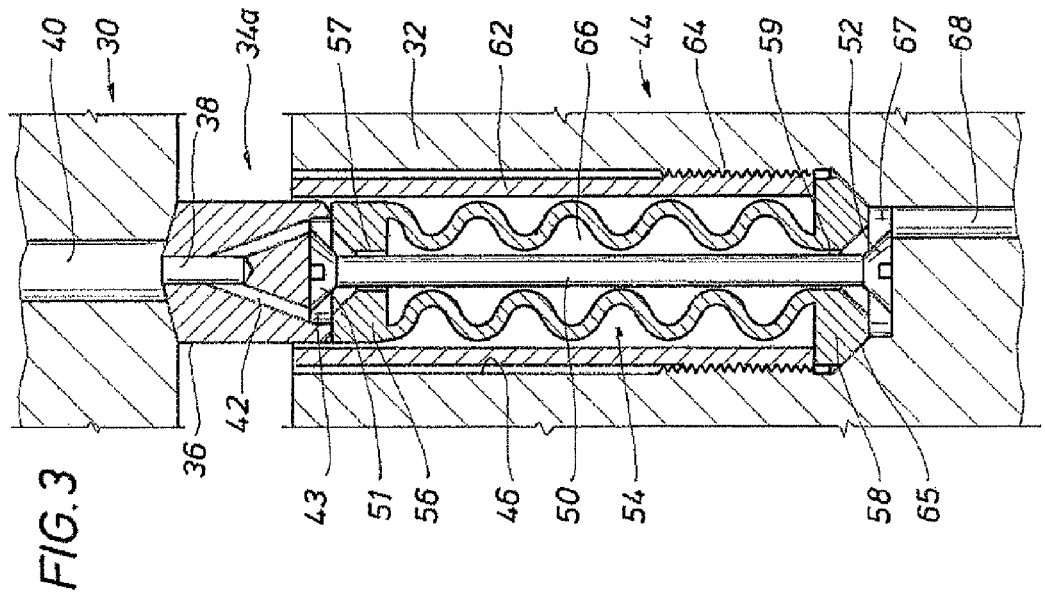
FIG. 3 illustrates a side sectional view of the hydraulic coupler of FIG. 2 in an engaged configuration.

FIG. 3 illustrates an example of a flowing configuration of the hydraulic coupler 34a. In this example, the male stinger 36 is moved downward within the pocket and aligned such that the surface of the stinger 36 around the cavity 43 is in contact with the upper base 56 but not contacting the upper poppet head 51 because of cavity 43. Applying a downward force compresses the sleeve 54 (contracts the bellows 60) to breach the sealing surface between the poppet head 51 and upper base 56. Continued downward pushing engages the poppet head 51 with the base of the cavity 43, ultimately the male stab 36 also downwardly urges the poppet 48 to breach the seal between the lower poppet head 52 and lower base 58. The lower poppet head 52 abuts the cavity 46 base. This provides a flow path from the flow line 40 through the distribution lines 42 and the sleeve 54 into the cavity 67 and the flow line 68. When the male stinger 36 is removed, the bellows 60 expands to engage the upper poppet head 51. The bias force/stored energy in the contracted bellows 60 pushes the poppet head 51 upward back to the closed position of FIG. 2.

Sea water applies hydrostatic pressure in the space 66 and to the bellows 60 outer surface. The pressure inside the bellows 60 may be less than hydrostatic. However the hydrostatic pressure alone cannot open the coupler 34 as shown in FIG. 3. Referring now to FIG. 4, a schematic example is presented for an explanation of why forming the bellows 60 diameter where it connects to the lower base 58 to be less than the upper poppet head 51 diameter self seals the coupler 34. As is known, the force from pressurizing a surface is a function of total surface area. Thus the pressure seal between the upper poppet head 51 and upper base 56 will be maintained if the resultant force of ambient pressure applied to the base 56 and bellows 60a has an upwardly directed vector. Referring back to FIGS. 2 and 3, and assuming the bellows 60 follows a repeating path, resulting forces taken along a period (90 degrees, 180 degrees, 360 degrees, . . . ), will cancel resulting in a net zero force directed along the axis of the coupler 34. Thus, the simplified version in FIG. 4 depicts the portion of the bellows 60a with its redundant undulations removed. From this view, it can be seen that in order to compress the sleeve 54a, thereby breaching the seal between the upper poppet head 51 and upper base 56, the forces resulting from applied pressure on the upper base 56 must exceed the resulting forces of applied pressure, in an upward direction, applied to the bellows 60a. From FIG. 4, it can be seen that the area on the upper base 56 subject to ambient pressure is found by determining the total upper surface area of the female portion 44 (shown having diameter $D_2$) and subtracting the upper poppet head 51 area (shown having diameter $D_1$). Similarly, the upward force on the bellows 60a from ambient pressure is found by subtracting the area where the bellows 60a connects with the lower base 58 (shown having diameter $D_3$) from the total upper surface area. Accordingly, as long as $D_1$ exceeds $D_3$, the force resulting from applied pressure will have a resultant in an upward direction, thereby maintaining the pressure seal between the upper poppet 51 and upper base 56. This remains true even if the external hydrostatic pressure compresses the bellows 60a so the poppet 48 lower head 52 abuts the cavity 46 base; which prevents further compression.

In one example of operation, a hydraulic connection is made between two members used in subsea hydrocarbon production, such as a running tool 10 and a tubing hanger 12. However, other members can include a remotely operated vehicle, casing hanger, wellhead housings, and the like. Making the connection, as example of which is shown in FIG. 3, includes pushing the male stab 36 against the outer base 56 and breaching the pressure seal between the upper poppet head 51 and contour in the bore 57. As noted above, the cavity 43 in the male stab 36 receives the poppet head 51 so the portion of the stab 36 around the cavity 43 can apply a force against the female member 44 to compress the tubular bellows 60. Further downward urging of the male stab 36 ultimately engages bottom of the cavity 43 with the poppet head 51 to move the poppet 48 with respect to the sleeve 54 and breach the seal between the lower poppet head 52 and lower base 58. The lower base 58 is always wedged against the sealing surface 65 in the pocket 46 bottom, thus allowing the lower poppet head 52 to move relative to the lower base 58 and into the cavity 67. This creates a flow path through the bore 57, the sleeve 54, and bore 59 that communicates fluid between the running tool 30 and tubing hanger 32. When fluid flow between the two members is no longer required, the compressive force against the sleeve 54 is removed by retracting the male stab 36. The resilient bellows 60 returns to its pre-loaded configuration shown in FIG. 2 and pulls the poppet 48 upward so that its upper and lower heads 51, 52 sealingly reseat into the bores 57, 59. The self sealing configuration of the female portion 44 ensures flow across the coupler 34 is blocked. However, the coupler 34 can be re-engaged at a later time with a stab 36, or other device, to provide fluid flow through the coupler 34.

The present system and method described herein, therefore, is well adapted to carry out and attain the ends and advantages mentioned, as well as others inherent therein. While a presently preferred embodiment has been given for purposes of disclosure, numerous changes exist in the details of procedures for accomplishing the desired results. For example, the male stab 36 can engage the coupler 34 without coupling the members in which the stab 36 and coupler 34 are respectively housed, for example the tubing hanger 32 and running tool 30. Similarly, in situations where the stab 36 and coupler 34 housings are engaged, the stab 36 can be released from the coupler 34 without disengaged their respective housings (e.g. hanger 32 and running tool 30). These and other similar modifications will readily suggest themselves to those skilled in the art, and are intended to be encompassed within the spirit of the present invention disclosed herein and the scope of the appended claims.

What is claimed is:

1. A hydraulic coupler for use in communicating fluid between members used in hydrocarbon production subsea comprising:
   first and second subsea well members, each having a hydraulic fluid port;
   a hollow tubular mounted to the second member and having a resilient corrugated side wall and a longitudinal axis, the interior of the tubular being in fluid communication with the hydraulic fluid port in the second member;
   a second seat in an end of the tubular proximate the second member;
   a first seat on an end of the tubular opposite the second seat and facing away from the second seat; and
   a poppet member coaxially disposed in the tubular having first and second ends, so that when the tubular is in a pre-loaded axially compressed configuration, the first end is in sealing engagement with the first seat and the second end is in sealing engagement with the second seat.

2. The coupler of claim 1, further comprising a cylindrical retainer coupled to and surrounding part of the tubular and threadingly attached to the second member to thereby anchor the coupler to the member.

3. The coupler of claim 1, wherein the poppet member is axially movable relative to the first and second seats.

4. The coupler of claim 1, wherein a first end of the tubular and an exterior of the tubular are adapted to be subjected to hydrostatic pressure of water subsea and wherein a diameter of the tubular proximate the first seat is greater than a diameter of the tubular proximate the second seat, so that when the exterior of the tubular is subjected to subsea water pressure, a force is exerted on the tubular that urges the first seat against the first end of the poppet.

5. The coupler of claim 1, wherein the tubular is disposed in a pocket formed within the second member.

6. The coupler of claim 1, wherein the first member comprises a male stab having a cavity on a surface that receives an end of the tubular having the first seat, wherein the first end of the poppet comprises an upper poppet head having a frusto-conically shaped side facing the second end that is in sealing contact with a seat in the first end when the tubular is in the pre-loaded axially compressed configuration to define the sealing engagement between the first seat and first end of the poppet member, and wherein the second end of the poppet comprises a lower poppet head having a frusto-conically shaped side facing the first end that is in sealing contact with a seat in the second end when the tubular is in the pre-loaded axially compressed configuration to define the sealing engagement between the second seat and second end of the poppet member, so that when the stab is pushed against the tubular, the tubular is axially compressed to breach the sealing engagement between the first seat and first end of the poppet member and the sealing engagement between the second seat and second end of the poppet member.

7. The coupler of claim 5, wherein the second member further comprises a cavity in the pocket base in fluid communication with the hydraulic port in the second member, so that when the stab is pushed against the tubular, the tubular is axially compressed and the second end of the poppet member extends into the cavity in the pocket base.

8. A method of hydraulically coupling members used in subsea hydrocarbon production, comprising:
   a. providing on a member used in subsea hydrocarbon production, an axially compliant hollow tubular having seats at its ends, a poppet member coaxially disposed in the tubular with ends extending outside the ends of the tubular and in sealing engagement with the seats, so that an end of the tubular is in pressure communication with a region ambient to the member and the opposite end of the tubular is in pressure communication with a flow line within the member;
   b. compressing the tubular by applying an axial force to opposing ends of the tubular thereby breaching the sealing engagements between the ends of the poppets and the seats;
   c. flowing fluid between the poppet and an end of the tubular, through the tubular, and out the other end of the tubular; and
   d. removing the force compressing the tubular so that the resilient tubular returns to the configuration in step (a) and sealing engagement reoccurs between the tubular ends and poppet.

9. The method of claim 8, wherein the tubular is compressed with a male stab having a cavity formed to receive the end of the poppet therein and fluid supply lines that communicate into the seat when the sealing engagement is breached.

10. The method of claim 8, wherein the tubular is corrugated.

* * * * *